(12) United States Patent
Collins et al.

(10) Patent No.: US 12,466,504 B2
(45) Date of Patent: *Nov. 11, 2025

(54) TRAILER AXLE CARTRIDGE

(71) Applicant: NORCO INDUSTRIES, INC., Compton, CA (US)

(72) Inventors: Jason Douglas Collins, Granger, IN (US); Jon David Stough, Angola, IN (US); Akos Peter Sefcsik, Middlebury, IN (US); William A Aske, Cassopolis, MI (US)

(73) Assignee: NORCO INDUSTRIES, INC., Compton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,127

(22) Filed: Aug. 1, 2024

(65) Prior Publication Data

US 2024/0391545 A1    Nov. 28, 2024

Related U.S. Application Data

(63) Continuation of application No. 18/174,454, filed on Feb. 24, 2023, now Pat. No. 12,077,232.
(Continued)

(51) Int. Cl.
*B62D 63/06*    (2006.01)
*B60B 35/00*    (2006.01)
(Continued)

(52) U.S. Cl.
CPC .......... *B62D 63/062* (2013.01); *B60B 35/007* (2013.01); *B60B 35/04* (2013.01);
(Continued)

(58) Field of Classification Search
CPC ...... B62D 63/06; B62D 63/062; B62D 63/08; B60G 11/18; B60G 11/183; B60G 11/189; B60G 11/20; B60G 2200/21; B60G 2200/22; B60G 2202/134; B60G 2300/04; B60B 35/006; B60B 35/007; B60B 35/02; B60B 35/04; B60B 35/06
See application file for complete search history.

(56) References Cited

U.S. PATENT DOCUMENTS

| 2,450,322 A | 9/1948 | Williams |
| 3,844,583 A | 10/1974 | Sakow |

(Continued)

FOREIGN PATENT DOCUMENTS

JP    04283114 A    10/1992

*Primary Examiner* — Laura Freedman
(74) *Attorney, Agent, or Firm* — Vorys, Sater, Seymour and Pease LLP; Rex W. Miller, II (57) ABSTRACT

Disclosed herein is an axle cartridge member for receiving a pair of torsion stub axles. The axle cartridge member includes a pair of laterally opposed bases, with each base defining a cavity therein for receiving an elongated stub housing of the torsion stub axles. The axle cartridge member also includes a pair of axle mounts that each includes a lateral opening extending into the cavity defined in the respective base, and an arch including a crossbar extending at a height above the bases wherein the arch further includes a portion that extends upward from each of the bases at an angle and meets the crossbar that extends generally horizontally between the portions of the arch.

20 Claims, 11 Drawing Sheets

Related U.S. Application Data (60) Provisional application No. 63/268,531, filed on Feb. 25, 2022.

(51) Int. Cl.
    *B60B 35/04*    (2006.01)
    *B60G 11/18*    (2006.01)
    *B62D 63/08*    (2006.01)

(52) U.S. Cl.
    CPC ............ *B60G 11/183* (2013.01); *B62D 63/08* (2013.01); *B60G 2202/134* (2013.01); *B60G 2300/04* (2013.01)

(56) References Cited

U.S. PATENT DOCUMENTS

| | | | |
|---|---|---|---|
| 4,140,333 A * | 2/1979 | Thoraval | B60G 21/055 280/124.13 |
| 4,453,735 A | 6/1984 | Penverne et al. | |
| 4,723,790 A | 2/1988 | Wharton | |
| 5,326,128 A | 7/1994 | Cromley | |
| 5,464,243 A | 11/1995 | Maiwald et al. | |
| 6,447,073 B1 | 9/2002 | Goettker | |
| 6,588,778 B1 | 7/2003 | McLaughlin | |
| 6,932,388 B2 * | 8/2005 | Few | B60G 3/12 280/789 |
| 7,111,854 B1 | 9/2006 | Tuthill et al. | |
| 7,566,063 B2 | 7/2009 | Oki et al. | |
| 7,758,056 B2 | 7/2010 | Vandenberg et al. | |
| 8,020,648 B2 | 9/2011 | Otto | |
| 8,191,911 B1 | 6/2012 | Reynolds | |
| 8,220,809 B2 | 7/2012 | Vandenberg et al. | |
| 8,226,098 B2 | 7/2012 | Vandenberg et al. | |
| 8,235,403 B2 | 8/2012 | Vandenberg et al. | |
| 9,199,522 B2 * | 12/2015 | Beck | B60G 11/183 |
| 9,428,027 B2 | 8/2016 | Iliuta | |
| 10,220,664 B1 | 3/2019 | Brey | |
| 11,148,722 B2 | 10/2021 | Garceau | |
| 12,077,232 B2 * | 9/2024 | Collins | B60B 35/007 |
| 2006/0201227 A1 | 9/2006 | Lepre et al. | |
| 2009/0033142 A1 | 2/2009 | Bitz et al. | |
| 2011/0115183 A1 | 5/2011 | Alesso et al. | |
| 2017/0096041 A1 | 4/2017 | Dempsey | |

* cited by examiner

TRAILER AXLE CARTRIDGE

CROSS-REFERENCE TO RELATED APPLICATION

This application is a continuation of U.S. patent application Ser. No. 18/174,454, filed Feb. 24, 2023, which claims the benefit of and priority to U.S. Provisional Application No. 63/268,531, filed Feb. 25, 2022, both of which are incorporated by reference herein in their entirety.

BACKGROUND

The present disclosure relates generally to suspension systems for towable trailers and other vehicles. More particularly, the disclosure relates to an axle cartridge for receiving two torsion stub axles.

Trailers are often employed for hauling portable equipment, livestock or recreational supplies. These trailers may be supported on torsion axles, which include a crossbar extending laterally across an underside of the trailer. The crossbar may be constructed with a square outer housing with rubber cords extending along inner corners of the outer housing. An inner steel bar with a square cross section extends between the rubber cords and out of the housing at each end where the inner bar and connects to a wheel assembly by a torsion arm. The four rubber cords provide cushioning to the rotation of the torsion arms caused by upward and downward movement of the wheel assemblies.

A torsion axle may provide an independent steel bar for each wheel assembly such that the wheel assemblies can react independently of one another when encountering bumps or uneven road conditions. The independence of the wheel assemblies maintains the trailer in alignment with a vehicle towing the trailer. In contrast, a straight axle extending directly between two wheel assemblies will often tend to become misaligned with the towing vehicle when one wheel of the trailer encounters a bump or obstacle and the other wheel does not. Torsion stub axles generally include a short crossbar that supports a single wheel assembly and does not extend entirely across the trailer. While providing independent suspension to two wheel assemblies, torsion stub axles must installed and aligned on both sides of the trailer, which may be tedious and time consuming. Further, once the stub axles have been installed, insufficient ground clearance may be provided for maintenance and repair, or for traversing some terrain.

SUMMARY OF DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

The present disclosure generally relates to an axle cartridge member for a receiving a pair of torsion stub axles. The axle cartridge member includes a pair of laterally opposed bases, each base defining a cavity therein for receiving an elongated stub housing of the torsion stub axles, a pair of axle mounts that each includes a lateral opening extending into the cavity defined in the respective base, and an arch including a crossbar extending at a height above the bases wherein the arch further includes a portion that extends upward from each of the bases at an angle and meets the crossbar that extends generally horizontally between the portions of the arch.

In accordance with one aspect of the present disclosure, an axle cartridge member is described. The cartridge member includes a pair of laterally opposed bases and an arch extending in a lateral direction between the bases, the arch including a crossbar extending at a height above the bases and oriented at an angle relative to the bases and a pair of torsion stub axles, each torsion stub axle including an elongated stub housing extending into a cavity defined in a respective base of the pair of laterally opposed bases.

In accordance with another aspect of the disclosure, a trailer assembly is disclosed. The trailer assembly includes a trailer frame and an axle cartridge member including a pair of laterally opposed bases and an arch extending in a lateral direction between the bases, the arch extending at an angle relative to each base and including a crossbar extending at a height above the bases. The trailer assembly also includes a pair of torsion stub axles, each torsion stub axle including an elongated stub housing extending into a cavity defined in a respective base of the pair of laterally opposed bases.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms "generally" and "substantially" are intended to encompass structural or numeral modification which do not significantly affect the purpose of the element or number modified by such term.

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Exemplary embodiments of the present disclosure relate a cartridge assembly for mounting a pair of torsion stub axles to the frame of a trailer assembly. Mounting torsion stub axles may be challenging due to the alignment and positioning of the stub axles to provide sufficient ground clearance. Additionally, it may be necessary to mount torsion stub axles to an existing trailer that was not designed with any specific mounting provisions.

Figure 1:
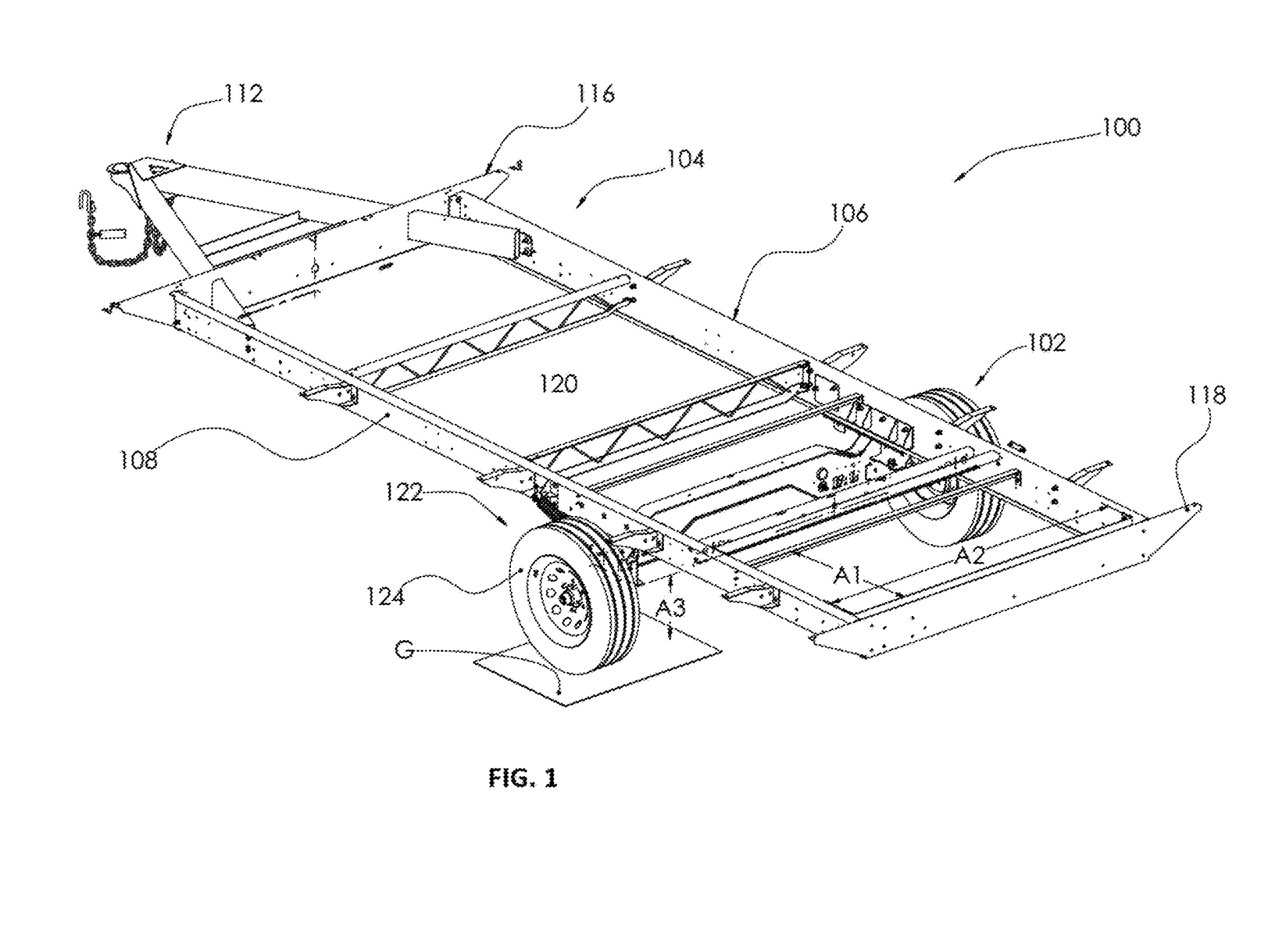
FIG. 1 is a perspective view of a trailer assembly including a pair of torsion stub axles mounted in an axle cartridge assembly in accordance with an example embodiment of the present disclosure.

Referring now to FIG. 1, there is shown an exemplary embodiment of a trailer assembly 100 in accordance with the present disclosure with an axle cartridge assembly 102 therein. The axle cartridge assembly 102 is mounted to an underside of a trailer frame 104. The depicted trailer frame 104 is just one example frame that can suitably incorporate the principles of the present disclosure. Indeed, many alternative designs and configurations of the frame 104 may be employed, without departing from the scope of this disclosure.

The trailer frame 104 includes a right-side rail 106 and a left-side rail 108 extending along a length of a trailer assembly 100. The side rails 106, 108 extend along and define a longitudinal direction of the trailer as indicated by arrows A1. A trailer hitch 112 is coupled to the side rails 106, 108 at a front end of the trailer assembly 100, which facilitates connecting the trailer assembly 100 to a towing vehicle (not shown). A front plate 116 and a back plate 118 extend between the side rails 106 and rigidize the trailer frame 104. The front and back plates 116, 118 extend along and define a lateral direction of the trailer as indicated by arrows A2. An underbelly 120 of the trailer frame 104 is defined as concavity in an underside of the trailer frame 104, generally between the side rails 106, 108, the front plate 116 and the back plate 118. A trailer bed (not shown) may be provided above the underbelly 120 to support equipment or other cargo thereon.

The trailer frame 104 is supported on a ground surface G by wheel assemblies 122 including tires 124. The wheel assemblies 122 are carried by the axle cartridge assembly 102 which couples to the side rails 106, 108 of the trailer frame 104 in a plurality of configurations (see, e.g., FIGS. 5A and 5B) to provide different amounts of ground clearance for the trailer assembly 100. A vertical direction is defined upwardly from the ground surface as indicated by arrows A3. The longitudinal, lateral and vertical directions indicated by arrows A1, A2 and A3 are used herein to describe the illustrated orientation of the embodiments described herein, even if the embodiments may be arranged in other orientations.

Figure 2A:
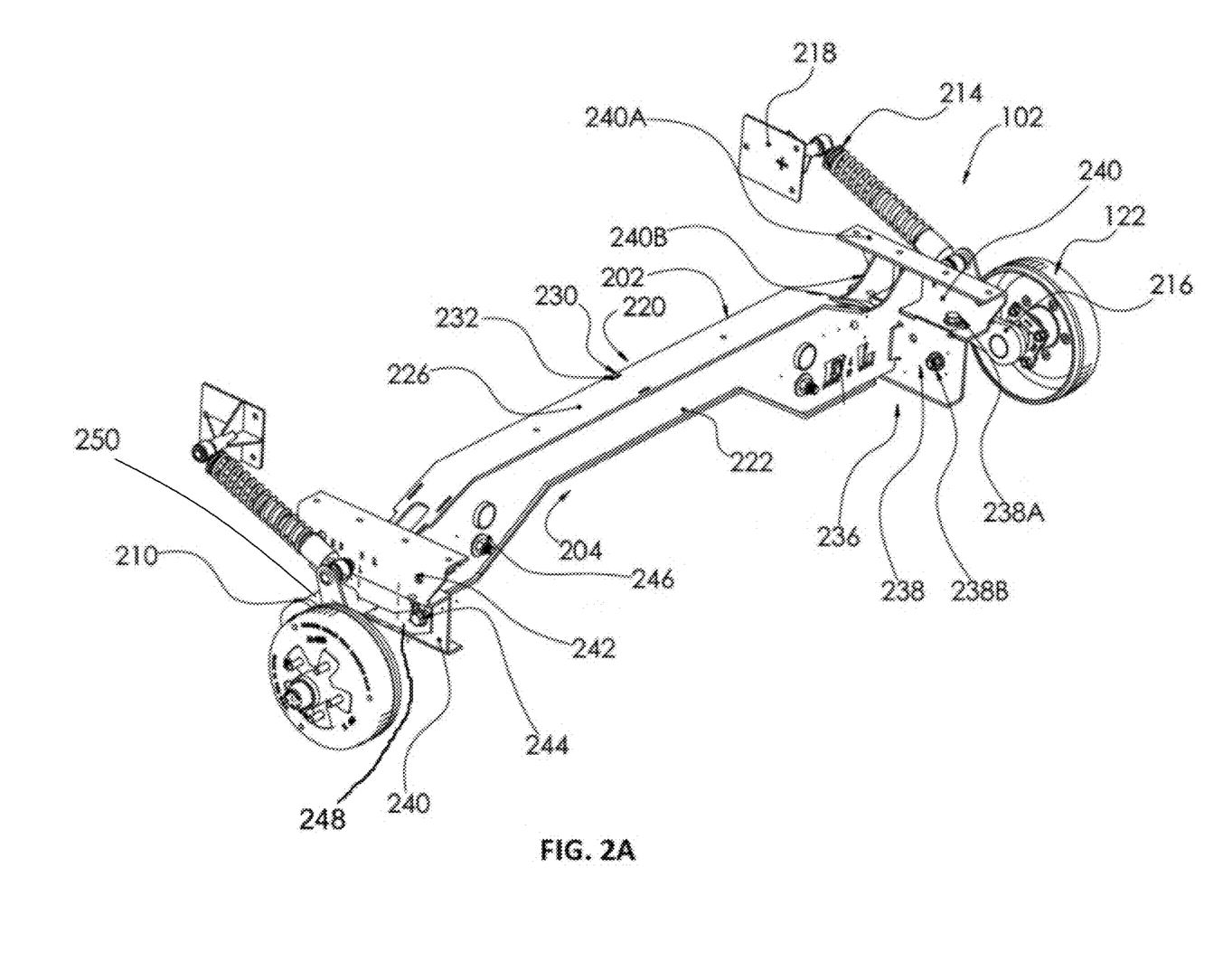
FIG. 2A is a perspective view of the axle cartridge assembly of FIG. 1 illustrating a pair of wheel assemblies and shock assemblies mounted to a cartridge member.

Referring now to FIG. 2A, the axle cartridge assembly 102 is illustrated without the tires 124 (FIG. 1), which are removed for clarity. The axle cartridge assembly 102 generally includes a cartridge member 202 defining a central arch 204, two torsion stub axles 210 received at each lateral end of the arch 204, the wheel assemblies 122 and shock assemblies 214. The wheel assemblies 122 and shock assemblies 214 are supported by a torsion arm 216 of the torsion stub axles 210. An upper mount 218 of the shock assemblies 214 may be coupled to an outer face of one of the side rails 106, 108 (FIG. 1), or in some embodiments, the upper mount 218 may be coupled directly to the cartridge member 202 (see, e.g., FIG. 2B).

The cartridge member 202 is generally constructed of a forward plate 220 and a rear plate 222 coupled to one another in a parallel arrangement by at least one spacer member 226. The spacer member 226 is generally orthogonal to the forward and rear plates 220, 222 and may be coupled thereto by welding, fasteners, or other coupling mechanisms. The spacer member 226 may include slots 230 around a periphery thereof for receiving corresponding tabs 232 on the forward and rear plates 220, 222. The tabs 232 engage the slots 230 to facilitate maintaining an appropriate spacing and orientation between the forward and rear plates 220, 222 while welding or otherwise coupling the forward and rear plates 220, 222 to the spacer member 226.

At the lateral ends of central arch 204, the cartridge member 202 includes mounting brackets 236. The mounting brackets 236 may be constructed of bent or folded sheet metal and extend longitudinally in forward and rearward directions from the front and back plates 220, 222. The mounting brackets 236 include a lower mount 238, or an axle mount, for coupling the torsion stub axles 210 to the cartridge member 202 and an upper mount 240, or a trailer mount, for coupling the axle cartridge assembly 102 to the trailer frame 104 (FIG. 1).

The lower mount 238 includes an upper surface 238A and a lower wall 238B descending from the upper surface 238A. Similarly, the upper mount 240 includes an upper surface 240A and a lower wall 240B descending from the upper surface 240A. The upper surfaces 238A, 240A are arranged generally orthogonally to the lower walls 238B, 240B. Thus, when the upper surfaces 238A, 240A are arranged in a generally horizontal configuration, the lower walls 238B, 240B extend in a generally vertical direction. The lower mount and the upper mount 240 may include mounting holes 242 therethrough for receiving mounting fasteners 244, to couple the respective mount 238, 240 to the appropriate mating structure. For example, the lower mount 238 receives mounting fasteners 244 through both the upper surface 238A and lower wall 238B. The mounting fasteners 244 secure a mounting plate 248 of the torsion stub axle 210 to the axle cartridge member 202. The mounting plate 248 receives the mounting fasteners 244 therethrough in orthogonal directions.

When the mounting plate 248 of the torsion stub axle 210 abuts the lower mount 238, an elongated stub housing 250 of the torsion stub axle 210 extends between the forward plate 220 and the rear plate 222 of the axle cartridge member 202. The forward and rear plates 220, 222 sandwich the elongated stub housings 250 therebetween to ensure alignment between the two elongated stub housings 250. The elongated stub housings 250 may exhibit a generally square cross section with opposite parallel sides abutting or engaging the forward and rear plates 220, 222. The forward and rear plates 220, 222 ensure that the torsion stub axles 210 are in alignment with one another, at least since each of the elongated stub housings are engaged with the same parallel plates 220, 222 on opposite lateral sides of the axle cartridge assembly 102.

Alignment fasteners 246 may extend through the front and rear plates 220, 222 to engage the elongated stub housings 250. The alignment fasteners 246 may facilitate maintaining an axle camber alignment as described in greater detail below with reference to FIG. 5B, for example.

Figure 9:
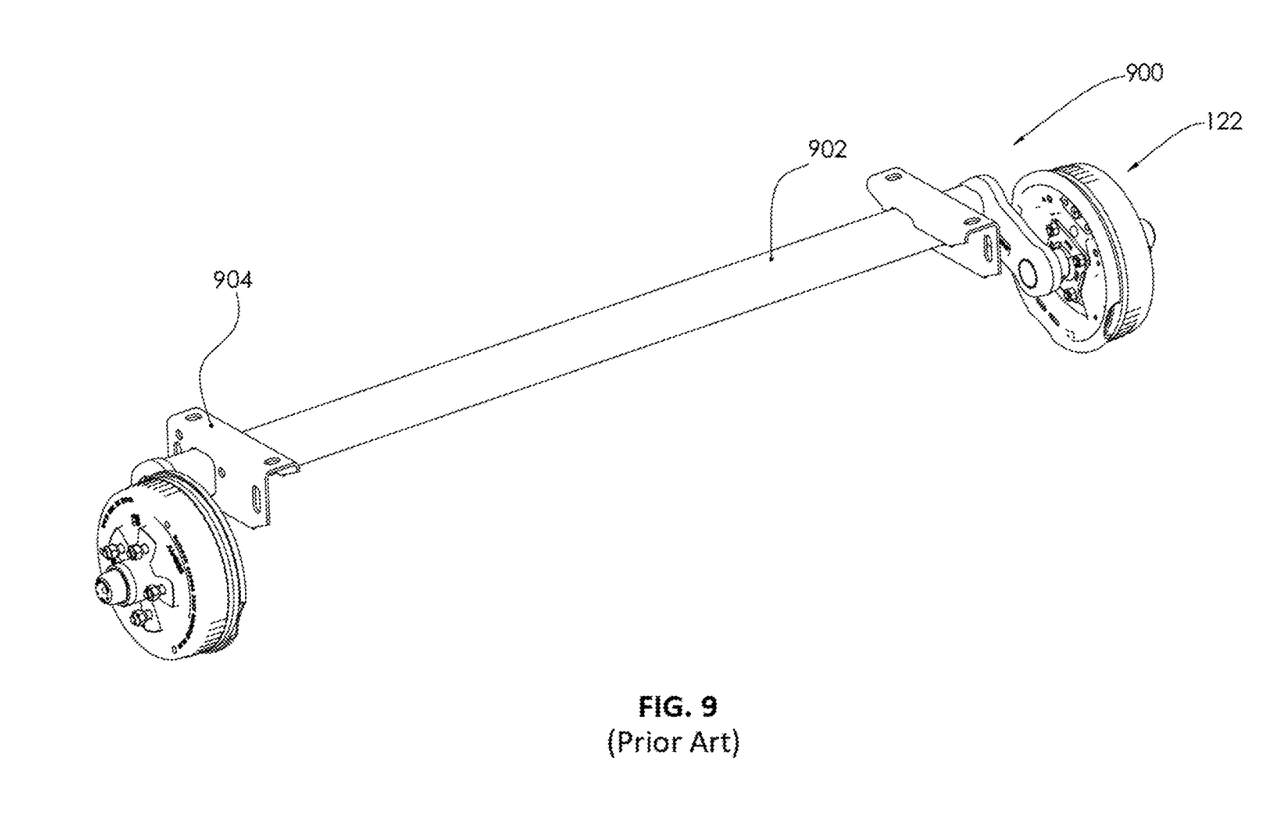
FIG. 9 is a perspective view of a traditional torsion axle assembly.

As indicated above, the upper mount 240 includes an upper surface 240A and a lower wall 240B descending from the upper surface 240A. The lower wall 240B extends vertically between the upper surface 240A of the upper mount 240 and the upper surface 238B of the lower mount 238. In some embodiments, the upper mount 240 may provide the same mounting pattern as the mounting plate 248 of the torsion stub axle 210. Thus, the axle cartridge assembly 102 may be mounted in the same manner as a traditional torsion axle 900 (FIG. 9).

Figure 2B:
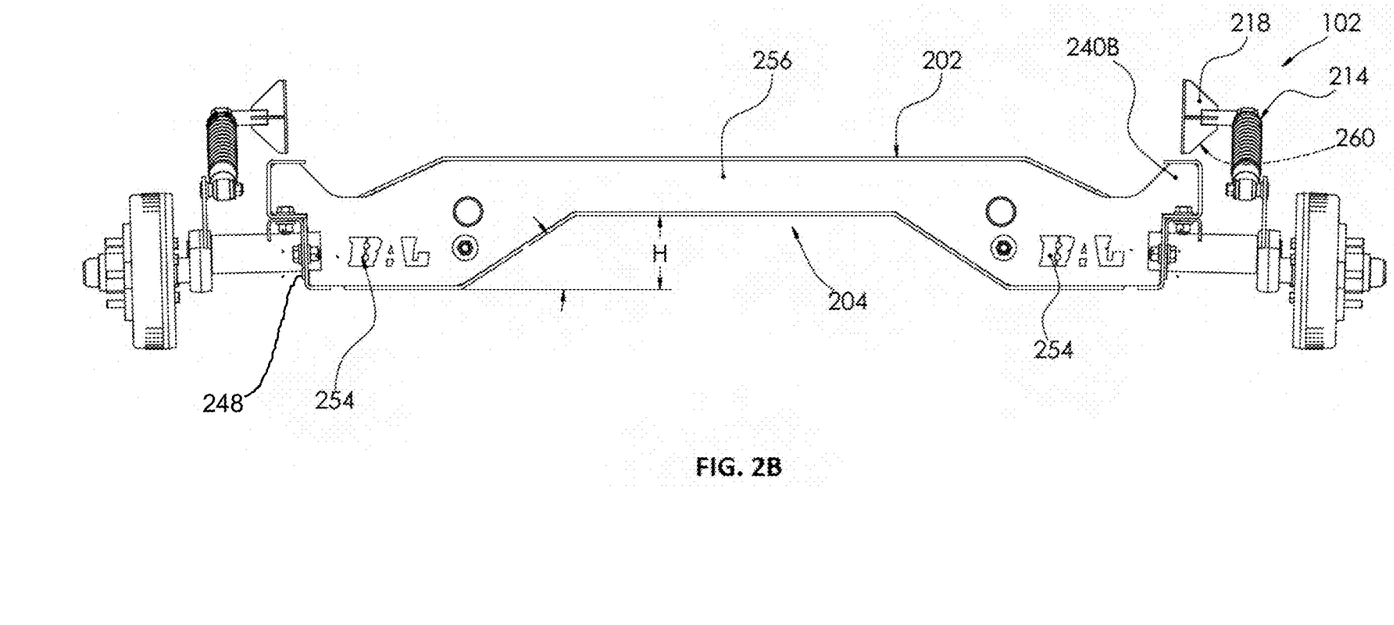
FIG. 2B is a front view of the axle cartridge assembly of FIG. 2A illustrating a central arch defined by the cartridge member.

Referring now to FIG. 2B, the axle cartridge assembly 102 is illustrated without the tires 124 (FIG. 1) or the fasteners 244, 246 (FIG. 2A). The central arch 204 extends between two bases 254 defined at a lower end of the cartridge member 202. The elongated stub housings 250 are received within the bases 244 of the central arch 204. The central arch 204 extends upwardly from the bases 254 at an angle α to a crossbar 256. The cross bar 256 extends horizontally in a lateral direction at a height H above the bases 254. The height H generally defines an additional ground clearance as compared to ground clearance provided by a traditional torsion axle 900 (FIG. 9).

In some embodiments, the upper mount 218 of the shock assemblies 214 may be coupled to the cartridge member 202. For example, an extension 260 (shown in phantom) of the top surface 240B may be provided to engage the upper mount 218. Since the cartridge member 202 may be fixedly mounted to the trailer frame 104 (FIG. 1), the shock assemblies 214 may be appropriately coupled between the frame 104 and the torsion stub axle 210 by coupling the upper mount of the 218 to the cartridge member 202. This arrangement could facilitate installation of the axle cartridge assembly 102 on an existing trailer frame 104 that may not have been designed with mounting points for shock assemblies 214. As indicated above, the upper mount 218 of the shock assemblies 214 may be coupled directly to the trailer frame 104 without departing from the scope of the disclosure.

Figure 3:
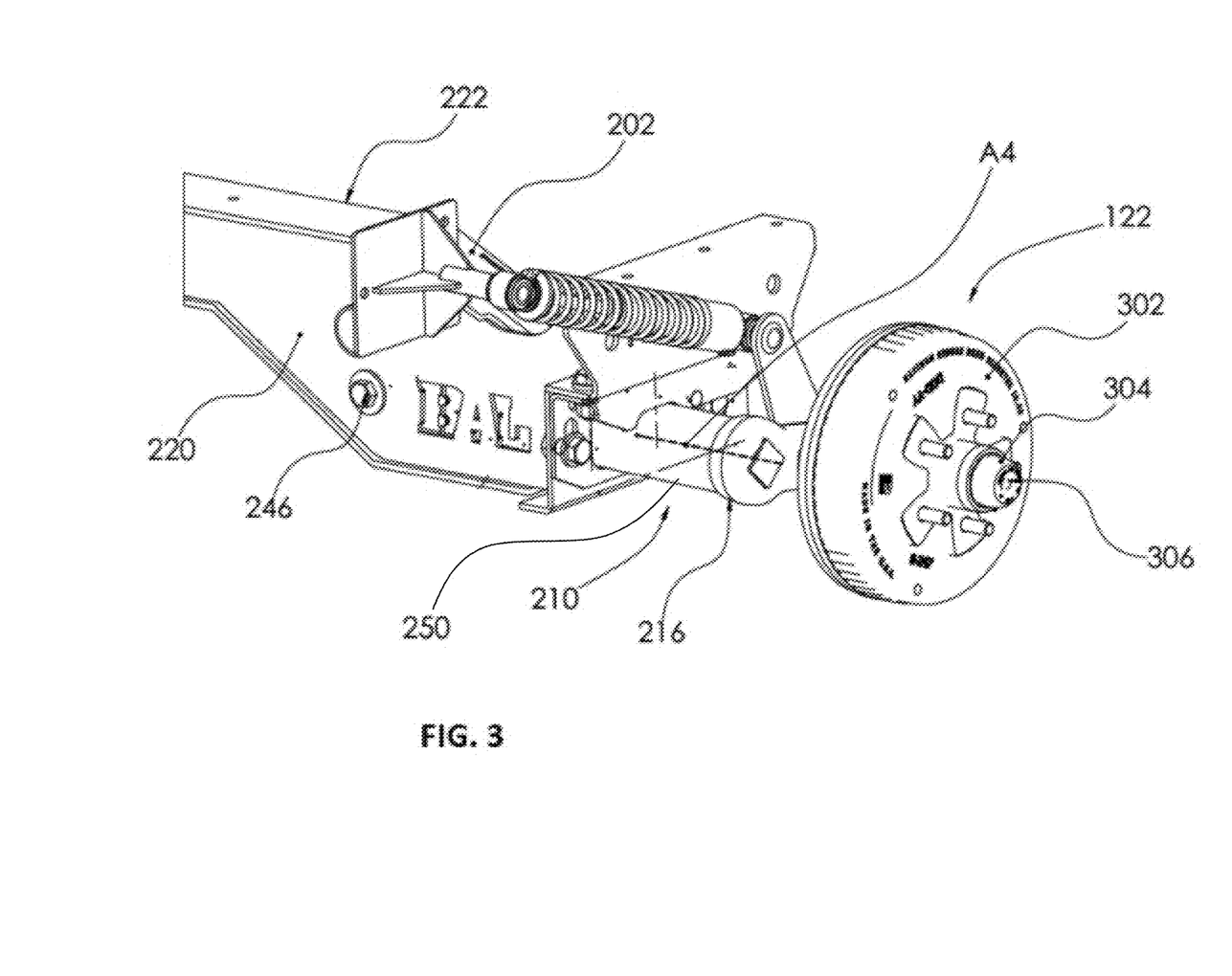
FIG. 3 is an enlarged perspective view of one of the wheel assemblies of FIG. 2A.

Referring to FIG. 3, wheel assembly 122 is illustrated coupled to the torsion stub axle 210, and the torsion stub axle 210 is illustrated coupled to the cartridge member 202. The wheel assembly 122 includes a wheel 302 defining a hub 304 therein. The hub 304 receives a spindle 306 of the torsion stub axle 210, about which the wheel 302 rotates. The spindle 306 extends laterally from the torsion arm 216 spaced from the elongated stub housings 250. The torsion arm 216 rotates about an axis A4 extending through the elongated stub housing 250 in response to vertical movement of the wheel assembly 122.

The elongated stub housing 250 extends through a lateral opening 402 (FIG. 4) defined through the lower mount 238 and between the forward and rear plates 220 of cartridge member 202. An opposed opening 402 is provided on the lower mount 238 on an opposite lateral side of the axle cartridge member 202. The lateral opening 402 exhibits a generally square perimeter, similar in size and shape to a cross section of the elongated stub housings 250. Thus, the lateral opening 402 may restrain the movement of the elongated stub housing 250 and facilitate maintenance of a camber angle for the wheel assembly 122. Adjustment fasteners 246 extend in a longitudinal direction through the forward plate 220 and engages an end of the elongated stub housing 250. A similar adjustment fastener 246 extends through the rear plate 222. The adjustment fasteners 246 define the vertical position of the end of the elongated stub housing 250 and thereby define a camber angle γ (FIG. 5B) for the wheel assemblies 122 as discussed in greater detail below.

Figure 4:
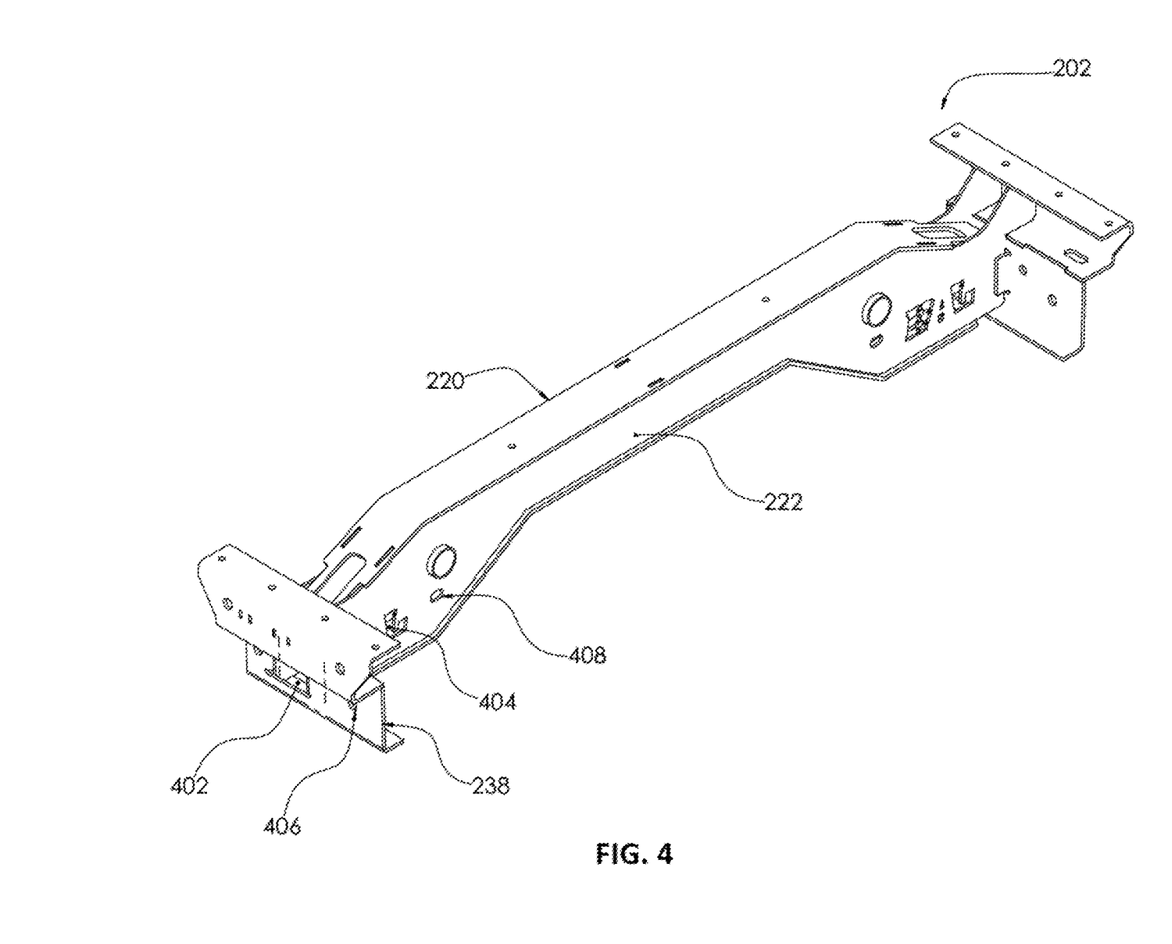
FIG. 4 is an enlarged perspective view of the cartridge member of FIG. 2A.

Referring to FIG. 4, the cartridge member 202 is illustrated without any other components of the torsion axle cartridge assembly 102 (FIG. 2). The lateral opening 402 extends though the lower mount 238 providing access to a cavity 404 defined between the forward and rear plates 220, 222. The cavity 404 receives the elongated stub housing 250 therein, and mounting holes 406 in the lower mount 238 receive mounting fasteners 244 (FIG. 2A) therein. Alignment holes 408 are provided through the forward and rear plates 220, 222 and receive the alignment fasteners 246 therein. Alignment holes 408 extend longitudinally into the cavities 404 from both forward and rearward directions such that the alignment fasteners 246 may engage the elongated stub housings 250 (FIG. 3). The position of the alignment holes 408 determines an orientation of the elongated stub housings 250 within the cavities 404, and thereby defines a camber angle γ (FIG. 5B) for the wheel assemblies 122, as discussed in greater detail below.

Figure 5A:
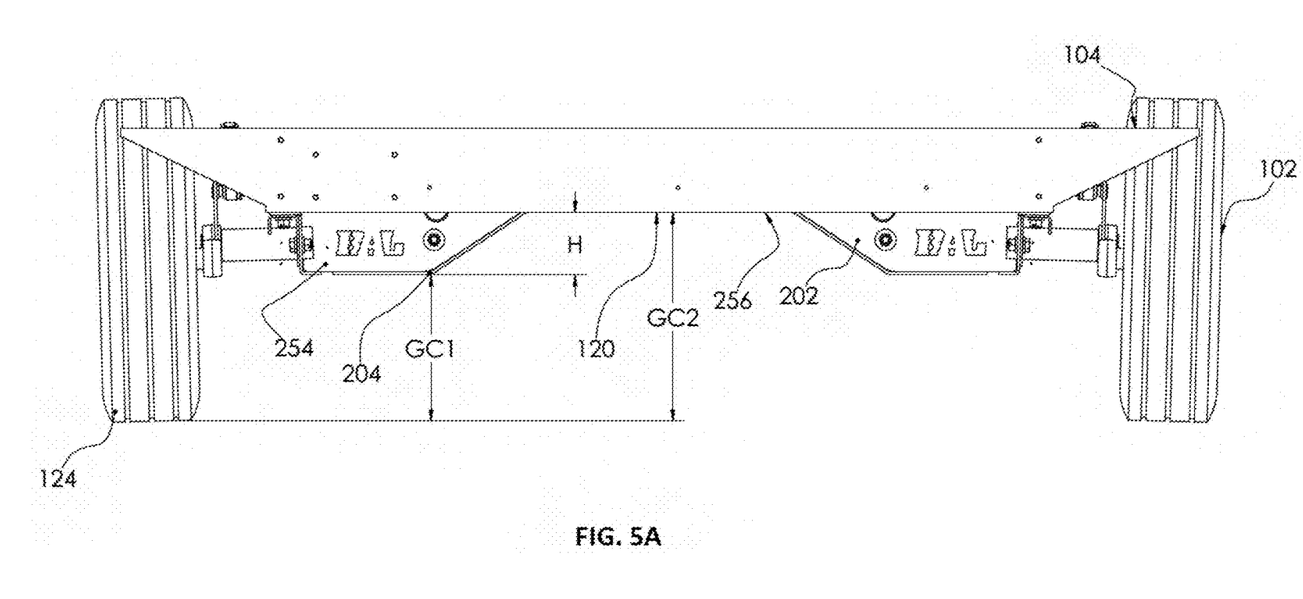
FIG. 5A is a rear view of the trailer assembly of FIG. 1 illustrating the central arch mounted in an underbelly of the trailer in accordance with one example embodiment of the present disclosure.

Referring now to FIG. 5A, a rear view of the trailer assembly 100 is illustrated. The axle cartridge assembly 102 is installed to the trailer frame 104 such that the crossbar 256 of the axle cartridge member 202 extends within the underbelly 120 of the trailer frame 104. The axle cartridge assembly 102 may be secured to the trailer frame 104 with mounting fasteners 244 extending through the mounting holes 244 (FIG. 2A) in the upper mounts 240 (FIG. 2A). The lower walls 240B of the upper mounts 240 may abut the left-side and right-side rails 106, 108 within the underbelly 120, and the fasteners 244 may extend laterally into the rails 106, 108 to couple the axle cartridge assembly 102 directly to the trailer frame 104.

In the configuration illustrated in FIG. 5A, additional ground clearance in a lateral center of the trailer frame 104 is provided between the torsion stub axles 210 by the central arch 204. A first ground clearance GC1 is defined beneath the bases 254 of the central arch 204 and second ground clearance GC2 is defined beneath the crossbar 256. The height H of the central arch 204 generally defines the additional ground clearance provided by the axle cartridge assembly 102 without the need for increasing the size of the tires 124.

Figure 5B:
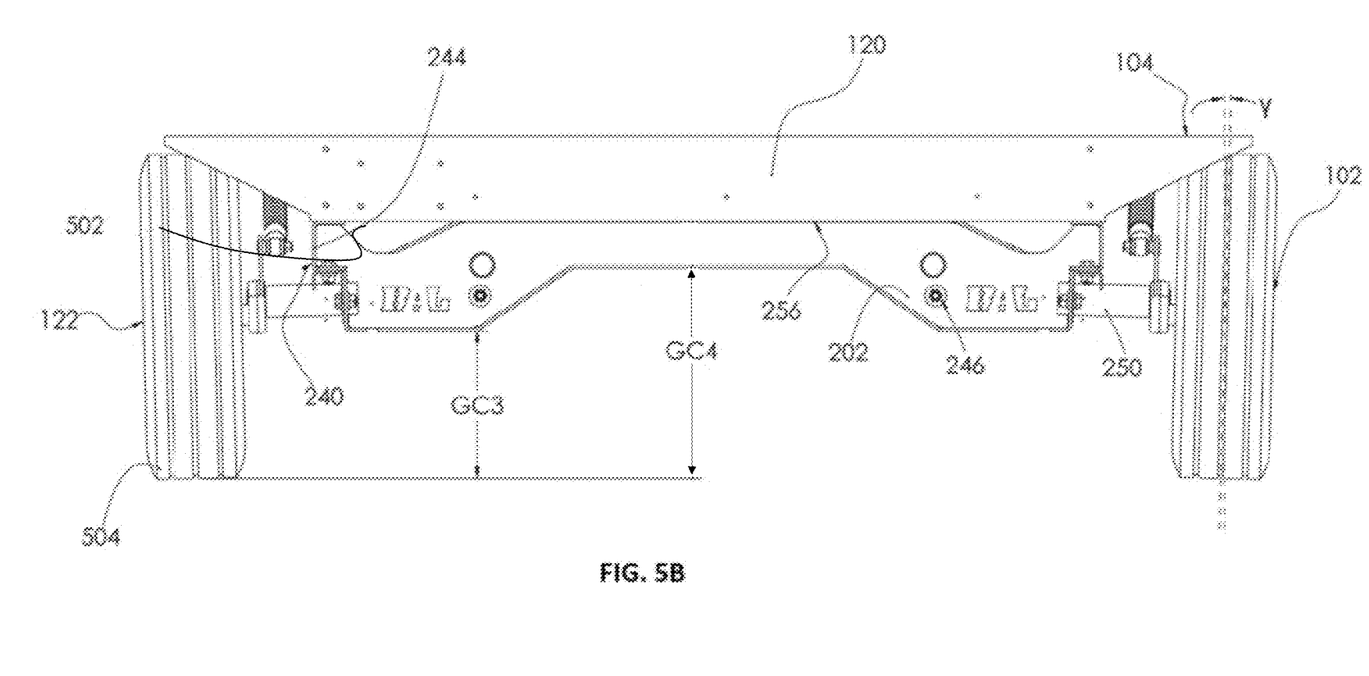
FIG. 5B is a rear view of a trailer assembly illustrating a central arch mounted beneath the underbelly of the trailer in accordance with an alternate example embodiment in accordance with the present disclosure.

Referring now to FIG. 5B, the axle cartridge assembly 102 is installed to the trailer frame 104 such that the crossbar 256 of the axle cartridge member 202 extends beneath the underbelly 120 of the trailer frame 104. The upper mounts 240 each engage an angle bracket 502, which may be welded or otherwise secured to the rails 106, 108. Mounting fasteners 244 extend through the angle brackets 502 and the upper mounts 240 to couple the axle cartridge assembly 102 directly to the trailer frame 104.

In the configuration illustrated in FIG. 5B, third and fourth ground clearances GC3, GC4 are defined beneath the bases 254 and the crossbar 256, respectively. Tires 504 may be provided on the wheel assemblies 122, which may be larger than the tires 124 illustrated in FIG. 5A. Thus, the ground clearances GC3 and GC4 may be greater than the ground clearances GC1 and GC2 of FIG. 5A. In this "lifted" configuration, the axle cartridge assembly 102 will not interfere with trailer components housed within the underbelly 120.

As indicated above, the alignment fasteners 246 define the camber angle γ for the wheel assemblies 122. As illustrated in FIG. 5B, the alignment fasteners 246 maintain the elongated stub housings 250 in an orientation with respect to the cartridge member 202 such that the wheel assemblies 122 define a positive camber angle γ when the trailer frame 104 is unloaded. With a positive camber angle, a top of the wheel assemblies 122 will lean outward with respect to the trailer frame 104. When the trailer frame 104 is loaded with a known load, the wheel assemblies 122 may be caused to define a neutral camber angle γ where the wheel assemblies 122 are generally vertical, for example. In other embodiments, the alignment fasteners 246 may extend through the cartridge member 202 in a location where a negative or neutral camber angle γ is defined to accommodate different loading conditions.

Figure 6:
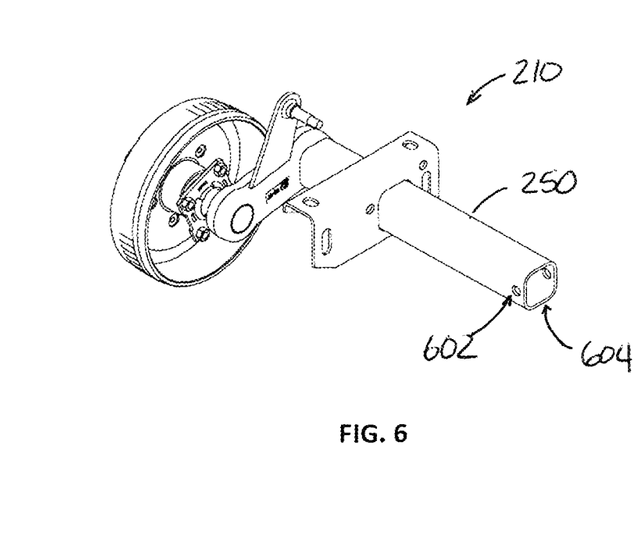
FIG. 6 is an enlarged perspective view of a torsion stub axle of FIG. 1 illustrating a cross hole formed in an elongated stub housing of the torsion stub axle for defining a camber angle.

Referring to FIG. 6, a torsion stub axle 210 is illustrated. The elongated stub housing 250 includes a cross hole 602 therein for receiving the alignment fasteners 246 (FIG. 5B). The alignment fasteners 246 will secure the vertical location of a lateral end 604 of the torsion stub axle 210 to define the camber angle γ.

Figure 7:
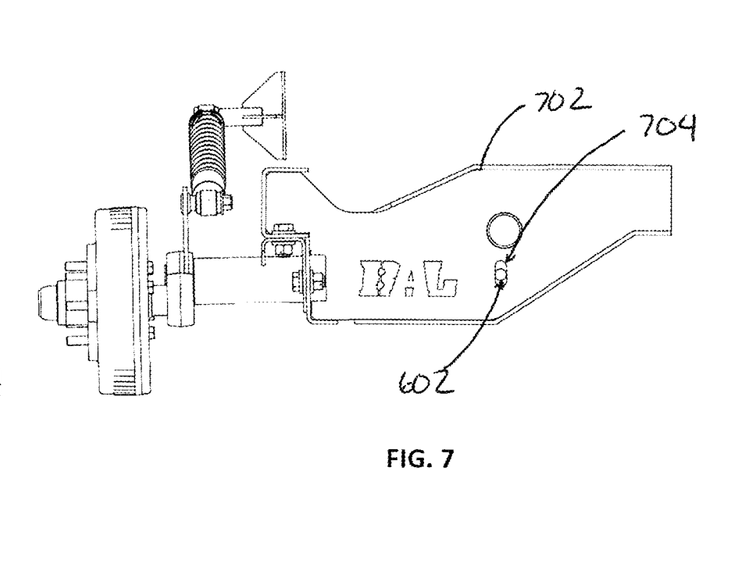
FIG. 7 is partial rear view of an alternate embodiment of an axle cartridge assembly including a slot for permitting a camber angle adjustment.

As illustrated in FIG. 7, in alternate embodiments, an axle cartridge member 702 may be provided with an elongated vertical slot 704 defined therein. The elongated vertical slot 704 will permit adjustment of the vertical location of the cross hole 602 with respect to the axle cartridge member 702, and thereby permit adjustment of the camber angle γ.

Figure 8:
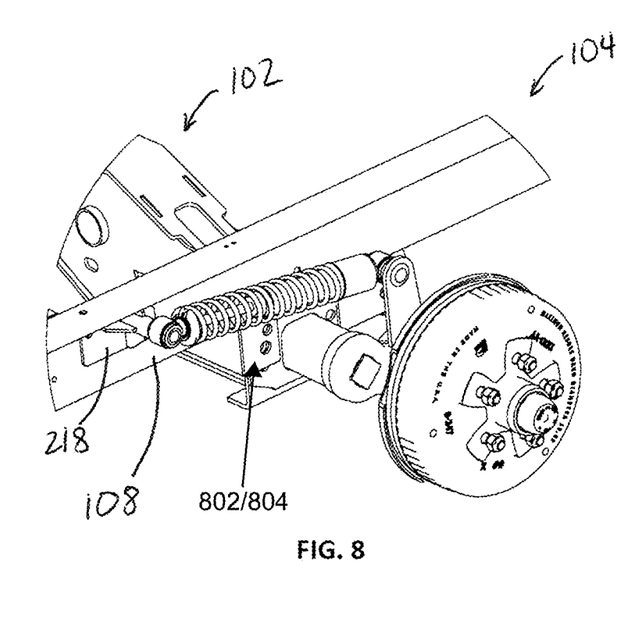
FIG. 8 is a partial perspective view of the trailer assembly of FIG. 1 illustrating the axle cartridge assembly mounted to the trailer frame.

Referring to FIG. 8, the axle cartridge assembly 102 is illustrated mounted to the frame assembly 104. The upper mount 218 of the shock assemblies 214 abuts the left-side rail 108 and may be secured thereto with fasteners (not shown). The upper mounts 240 (FIG. 2A) on the axle cartridge assembly 102 may be employed to mount the axle cartridge assembly to the frame assembly 104 as described above. A mounting bracket 802 provided on the trailer frame 104 for a traditional torsion axle (see FIG. 9) does not interfere with the mounting of the axle cartridge assembly 102.

Referring now to FIG. 9, a traditional torsion axle assembly 900 is illustrated. An elongated axle housing 902 is provided, which may span the entire lateral length of a trailer frame 104 (FIG. 1). Wheel assemblies 122 are supported at opposite lateral ends of axle housing 902 and may be associated with independent suspensions within the axle housing 902. Angle brackets 904 are provided along the axle housing 902 to facilitate coupling the torsion axle assembly 900 to the trailer frame 104. The angle brackets 904 may provide similar mounting options as the upper mounts 240 (FIG. 2A) on the axle cartridge assembly 102. However, at least since the axle housing 902 extends generally straight between the wheel assemblies 122, the torsion axle assembly 900 may not provide the same ground clearances as the axle cartridge assembly 102 of the present disclosure.

Figure 10:
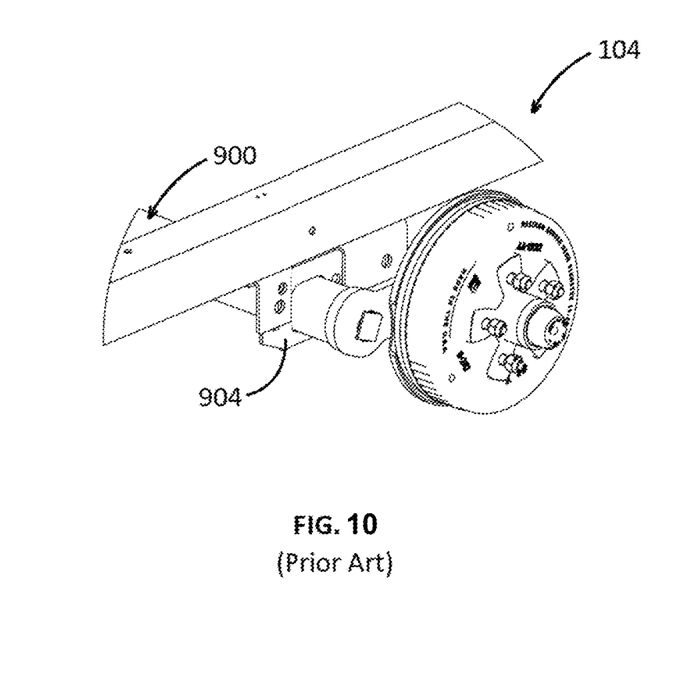
FIG. 10 is a perspective view of the traditional torsion axle assembly mounted to a trailer frame.

Referring now to FIG. 10, the traditional torsion axle assembly 900 is illustrated mounted to the trailer frame 104. The angle brackets 904 may engage the mounting brackets 804, and be secured thereto with fasteners (not shown.)

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. An axle cartridge member for a receiving a pair of torsion stub axles therein, the axle cartridge member comprising:
  a pair of laterally opposed bases, each base defining a cavity therein for receiving an elongated stub housing of the torsion stub axles;
  a pair of axle mounts that each includes a lateral opening extending into the cavity defined in the respective base; and
  an arch including a crossbar extending at a height above the bases, wherein the arch further includes a portion that extends upward from each of the bases at an angle and meets the crossbar that extends generally horizontally between the portions of the arch.

2. The axle cartridge member of claim 1, wherein the pair of bases are constructed from parallel forward and rear plates separated by at least one spacer member such that the forward and rear plates may engage opposite parallel sides of the elongated stub housing received therebetween.

3. The axle cartridge member of claim 2, wherein the forward and rear plates each include adjustment holes extending longitudinally into the cavities, the adjustment holes configured to receive an adjustment fastener therethrough.

4. The axle cartridge member of claim 1, further comprising at least one trailer mount arranged for coupling the axle cartridge member to a trailer frame.

5. The axle cartridge member of claim 4, wherein the at least one trailer mount includes a pair of trailer mounts, each trailer mount disposed above a respective axle mount.

6. The axle cartridge member of claim 5, wherein each trailer mount includes an upper surface and a lower wall extending generally orthogonally to the upper surface.

7. The axle cartridge member of claim 6, wherein each trailer mount is constructed of a bent or folded sheet metal plate formed continuously with the respective axle mount, each bent or folded sheet metal plate extending longitudinally to define the upper surface and lower wall.

8. The axle cartridge member of claim 4, wherein the at least one trailer mount includes a pair of trailer mounts, with each trailer mount being disposed above a respective axle mount and with each trailer mount comprising an upper trailer mount surface and a lower trailer mount wall extending generally orthogonally to the upper trailer mount surface;
  wherein each axle mount includes an upper axle mount surface and a lower axle mount wall extending generally orthogonally to the upper axle mount surface; and
  wherein the lower trailer mount wall of each trailer mount extends vertically between the upper trailer mount surface of the trailer mount and the upper axle mount surface of the axle mount.

9. An axle cartridge assembly, comprising:
- an axle cartridge member including a pair of laterally opposed bases and an arch extending in a lateral direction between the bases, the arch including a crossbar extending at a height above the bases and oriented at an angle relative to the bases; and
- a pair of torsion stub axles, each torsion stub axle including an elongated stub housing extending into a cavity defined in a respective base of the pair of laterally opposed bases.

10. The axle cartridge assembly of claim 9, further comprising a plurality of mounting fasteners coupling the pair of torsion stub axles to the axle cartridge member.

11. The axle cartridge assembly of claim 9, wherein the pair of bases and the arch are constructed from parallel forward and rear plates, and wherein the elongated stub housings each include parallel sides abutting each of the forward and rear plates.

12. The axle cartridge assembly of claim 11, further comprising a plurality of adjustment fasteners extending in a longitudinal direction through the forward and rear plates and engaging the elongated stub housings within the cavities.

13. The axle cartridge assembly of claim 9, wherein the arch extends upward at the angle from each of the bases to the crossbar, and wherein the crossbar extends generally parallel with the elongated stub housings.

14. The axle cartridge assembly of claim 9, further comprising at least one trailer mount configured to couple the axle cartridge member to a trailer frame, wherein the at least one trailer mount includes an upper trailer mount surface and a lower trailer mount wall extending generally orthogonally to the upper surface, and wherein each of the torsion stub axles includes a mounting plate for receiving mounting fasteners therethrough in orthogonal directions.

15. The axle cartridge assembly of claim 14, further comprising a pair of axle mounts, each axle mount coupled to a respective base of the pair of laterally opposed bases, and each axle mount comprising an upper axle mount surface and a lower axle mount wall extending generally orthogonally to the upper axle mount surface;
- wherein each trailer mount is disposed above a respective axle mount; and
- wherein the lower trailer mount wall of each trailer mount extends vertically between the upper trailer mount surface of the trailer mount and the upper axle mount surface of the axle mount.

16. The axle cartridge assembly of claim 9, further comprising a pair of wheel assemblies, each wheel assembly including a wheel coupled to a respective one of the torsion stub axles.

17. The axle cartridge assembly of claim 9, further comprising a pair of shock assemblies, each shock assembly coupled to a respective one of the torsion stub axles.

18. A trailer assembly, comprising:
- a trailer frame;
- an axle cartridge member including a pair of laterally opposed bases and an arch extending in a lateral direction between the bases, the arch extending at an angle relative to each base and including a crossbar extending at a height above the bases; and
- a pair of torsion stub axles, each torsion stub axle including an elongated stub housing extending into a cavity defined in a respective base of the pair of laterally opposed bases.

19. The trailer assembly of claim 18, further comprising a pair of wheel assemblies, each wheel assembly including a wheel coupled to a respective one of the torsion stub axles.

20. The trailer assembly of claim 18, further comprising a plurality of mounting fasteners coupling the pair of torsion stub axles to the axle cartridge member and coupling the axle cartridge member to the trailer frame.

* * * * *